United States Patent [19]

Brodie et al.

[11] Patent Number: 5,352,010
[45] Date of Patent: Oct. 4, 1994

[54] POST ATTACHED STRUCTURES FOR WINDOW ASSEMBLIES

[76] Inventors: James L. Brodie, 7355 Yorkshire, Hudsonville, Mich. 49426; Timothy A. Davis, 1362 Chevelle, Jenison, Mich. 49428

[21] Appl. No.: 849,293

[22] Filed: Mar. 10, 1992

[51] Int. Cl.$^5$ .............................................. B62D 25/10
[52] U.S. Cl. .................................... 296/192; 296/201
[58] Field of Search ............................. 296/192, 201, 93

[56] References Cited

U.S. PATENT DOCUMENTS

| | | | |
|---|---|---|---|
| 3,843,982 | 10/1974 | Lane et al. | |
| 3,845,983 | 11/1974 | Heintz | 296/84 |
| 3,959,941 | 6/1976 | Smith | 52/400 |
| 4,015,368 | 4/1977 | Court et al. | 49/488 |
| 4,119,325 | 10/1978 | Oakley et al. | 277/207 |
| 4,220,298 | 9/1980 | Willis | 244/129 |
| 4,505,511 | 3/1985 | Hänle et al. | 296/93 |
| 4,611,849 | 9/1986 | Trenkler | 296/201 |
| 4,679,845 | 7/1987 | Detampel et al. | 296/192 |
| 4,683,694 | 8/1987 | Ziegler | 52/208 |
| 4,712,287 | 12/1987 | Johnston | 29/469 |
| 4,738,482 | 4/1988 | Bohm et al. | 296/216 |
| 4,765,672 | 8/1988 | Weaver | 296/84 |
| 4,765,677 | 8/1988 | Nagata | 296/216 |
| 4,778,366 | 10/1988 | Weaver | 425/110 |
| 4,789,574 | 12/1988 | Selvey | 428/31 |
| 4,792,425 | 12/1988 | Weaver | 264/252 |
| 4,847,977 | 7/1989 | Gold | 296/201 X |
| 4,858,988 | 8/1989 | Morgan et al. | 296/201 |
| 4,864,786 | 9/1989 | Harris, Jr. | 52/214 |
| 4,891,913 | 1/1990 | Shimura et al. | 49/493 |
| 4,925,237 | 5/1990 | Bohn et al. | 296/216 |
| 4,950,019 | 8/1990 | Gross | 296/93 |
| 4,966,245 | 10/1990 | Pfister | 180/68.6 |
| 5,029,549 | 7/1991 | Armando | 114/361 |
| 5,050,928 | 9/1991 | Bohm et al. | 296/216 |

FOREIGN PATENT DOCUMENTS 264770  9/1968  Austria .

OTHER PUBLICATIONS

1994 J–Model quarter window quotation from Buick–Oldsmobile–Cadillac group (BOC Lansing), GM Corporation, Warren, Mich.
Material Safety Data Sheet, Essex Chemical Products, Inc. Sayrevill, N.J.
Material Safety Data Sheet, Dorrie Process Co., Inc., Norwalk, Conn.

*Primary Examiner*—Joseph D. Pape
*Attorney, Agent, or Firm*—Price, Heneveld, Cooper, DeWitt & Litton

[57] ABSTRACT

A multi-part, detachable and preassembled panel assembly is provided for use in combination with a vehicle, comprising a first panel having a peripheral edge and adapted to close an opening in the vehicle. A second panel is provided which is adapted to be adjacent the first panel and overlie at least a portion of the vehicle. The first and second panels are detachably coupled to one another by an attachment member molded directly on at least a portion of the peripheral edge of the first panel and including a portion for detachably receiving a securing post extending from the second panel. The second panel is also secured directly to the portion of the vehicle the panel covers by a coupler distant from the attachment member.

36 Claims, 6 Drawing Sheets

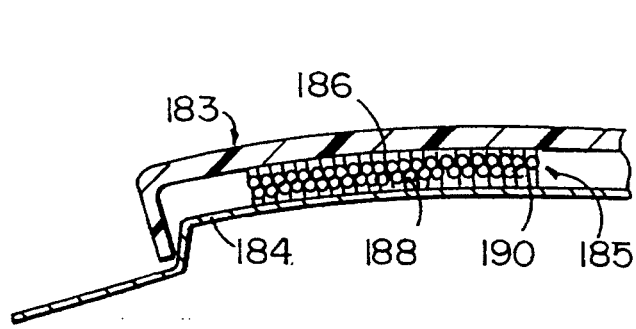
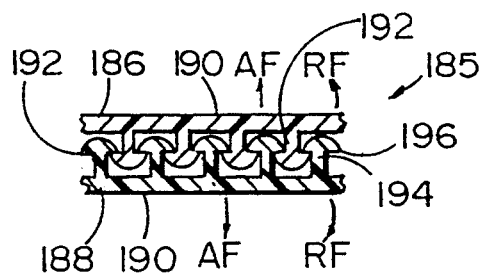
FIG. 12   FIG. 12A
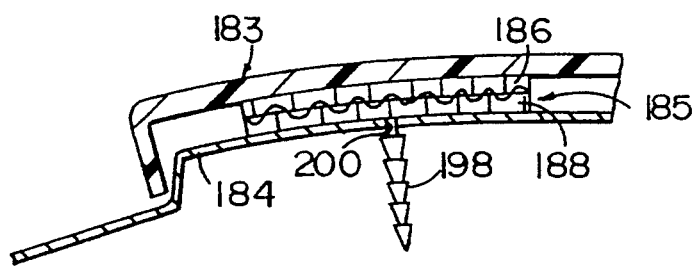
FIG. 13
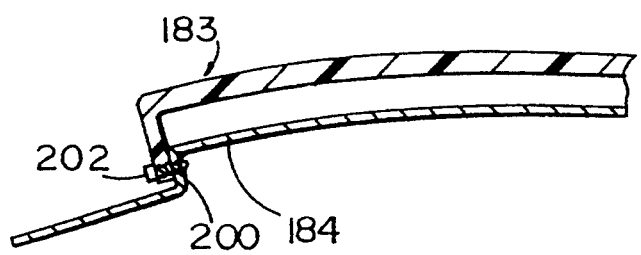
FIG. 14
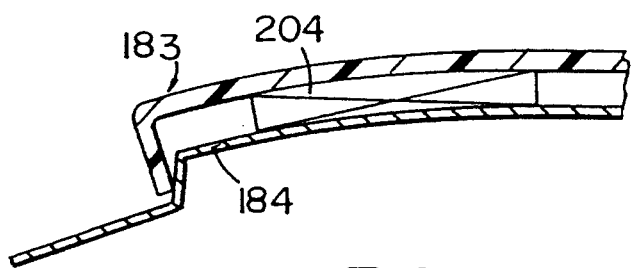
FIG. 15

POST ATTACHED STRUCTURES FOR WINDOW ASSEMBLIES

FIELD OF THE INVENTION

This invention relates to panel assemblies for use in vehicles. More particularly, this invention relates to window or decorative panel assemblies for vehicles having an attached applique, leaf screen, cowl or decorative body panel.

BACKGROUND OF THE INVENTION

In a typical vehicle, the vehicle exterior or body consists of many panels bolted or welded to an underlying frame. These body panels are shaped so as to provide an aesthetically pleasing, yet functional design. In certain areas of the vehicle body, the panels are quite small and are provided to conceal aspects of the vehicle housing serviceable parts. Often such panels are merely decorative.

In an effort to make a more aerodynamic vehicle, auto manufacturers wish to reduce exterior features which tend to produce turbulence and wind noise. Turbulence is often produced at boundaries between vehicle structures, such as the hood and windscreen and other window-to-body transitions about the passenger compartment. Because of the difference in materials used at such areas, that is, sheet metal to glass or another sheet metal panel, such transitions require a close fit. To achieve such close tolerances, improved tooling and design techniques are required, resulting in increased costs.

The prior known panels have normally been rigidly attached to the vehicle fragile either by way of welds or other permanent fasteners. Such panels were typically made from the sheet metal or plastic as a separate part. Others were designed as an integral portion of the vehicle frame making it essentially impossible to gain access behind the panel from the vehicle exterior. Such integral designing of the panels resulted in increased costs for tooling and manufacturing of the vehicle frame. Disadvantages inherent in these later plastic panels included misalignment of the metal stamping within the unsupported plastic panel resulting in a poor fit of the panel to the vehicle body.

SUMMARY OF THE INVENTION

The present invention provides a multi-part panel assembly which satisfies fitting requirements with minimal tooling, inventory, and labor time involved. Specifically, the invention is a two-piece panel assembly provided pre-assembled for installation on a vehicle. The two panels comprising the assembly may be detachable from each other and the vehicle to aid in replacement and easy access.

Accordingly, the present invention provides a multi-part panel assembly especially adapted for use in vehicles which is preassembled for easy installation. The preassembled panel assembly reduces irregularities associated with subjective placement of the assembly in the vehicle while allowing easy replacement of the individual components.

In general, a broad form of the invention is an assembly including a first panel adapted to fit in and/or close an opening of the vehicle. A second panel is adapted to lie adjacent the first panel and overlie at least a portion of the vehicle. An attachment member is secured on the peripheral edge of the first panel for detachably coupling the second panel to the edge of the attachment member. The second panel also includes means for detachably mounting the second panel to the first panel. In a preferred embodiment, the second panel is also detachably coupled at a second location to the vehicle.

In another form of the invention, the multi-part panel assembly comprises a transparent, sheet-like panel having a peripheral edge. Molded to the transparent, sheet-like panel, about at least a portion of the peripheral edge, is a polymeric attachment member or gasket. The gasket is provided to locate and seal the transparent, sheet-like panel in an opening in the vehicle body and includes a first portion of a securing means at its outer edge.

A second panel is adapted to overlie and conceal the attachment member and a predetermined portion of the vehicle frame. The second panel includes a second portion of a securing means for engaging the first portion of the securing means defined in the gasket, creating a detachable coupling therebetween. Preferably, the second panel is also detachably coupled to that portion of the vehicle frame which the panel overlies at a position spaced from the securing means.

In a preferred form of the invention, the multi-part panel assembly includes a transparent window pane designed to fit in one of the recesses defined in the vehicle body. A gasket member is molded directly on at least a portion of the peripheral edge of the window from a moldable, resinous material such that the gasket can be securely adhered to the window. A portion of the gasket exterior is molded so as to define a female coupler.

Lying adjacent and partially overlapping the window and molded gasket is a second decorative panel or applique also preferably molded from a resinous material. An inside surface of the applique has a male coupler adapted to engage the female coupler on the exterior of the gasket. The applique overlies a predetermined portion of the vehicle body and is detachably coupled at a position from the male/female coupling thereto by a second coupler. The second coupling includes a variety of fasteners readily disconnected under tension.

As will be understood from the invention, numerous advantages over prior known panel assemblies are provided. These include cost savings and manufacturing simplification by the elimination of prior known metal brackets due to the improved coupling of the panel to the vehicle. The new panel assemblies provide significantly better manufacturing consistency and tolerance for fitting the applique to the vehicle body. Because of the closer tolerance between the panels, wind noise caused by turbulence at the panel boundaries is reduced. The closer tolerance provided by the molded attachment members also eliminates the need for threaded fasteners in prior known assemblies. The panel assembly also enables easier attachment and installation of the window and applique to the vehicle, providing a greater ability to properly position the applique in the vehicle itself. Further, the panel assembly eliminates the need for multiple, preformed, separate elements which must be joined together by the vehicle manufacturer. The panel assembly is shipped as a preformed unit thereby reducing separate parts inventories for the manufacturer. The panel assembly is durable and noncorrosive and well adapted for use in often harsh environments encountered by the vehicle. Yet another advantage of the instant invention is the ability to place the panel assembly in existing vehicles, replacing the existing panels or appliques.

BRIEF DESCRIPTION OF THE DRAWING FIGURES

FIGS. 12-15 illustrate alternate embodiments of detachable fasteners for use in connection with the invention.

DETAILED DESCRIPTION OF THE PREFERRED EMBODIMENTS

Figure 1:
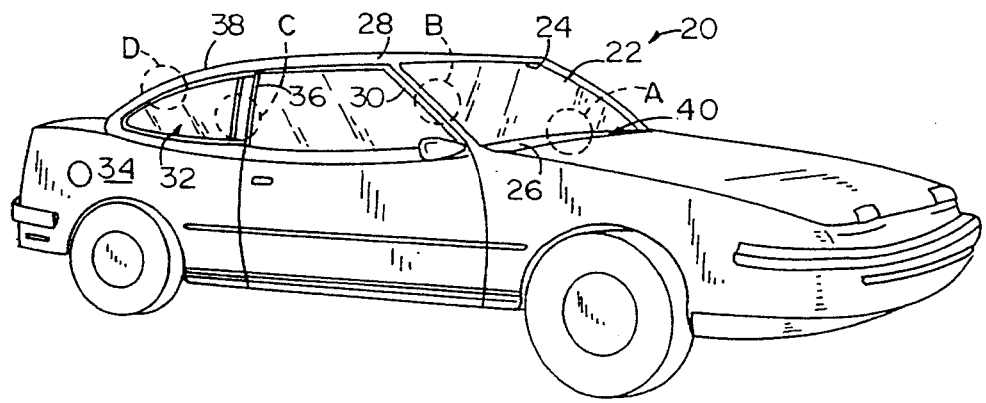
FIG. 1 is an oblique view of a generic vehicle illustrating the various applications of the present invention.

Referring now to the drawings in greater detail, FIG. 1 is a perspective view of a vehicle highlighting locations, indicated by dashed circles A-D, where the present invention is typically used. Vehicle 20 includes a windscreen 22 nested within and closing a windscreen opening 24 bordered along its lower edge by a cowl or leafscreen 26 providing air circulation into the engine compartment and/or heater ducts, along its upper edge, by a roof panel 28 and laterally by A-pillars 30. Other fixed panels include rear quarter window 32 bounded by rear quarter panel 34, B-pillar 36, and C-pillar 38. C-pillars 38, roof panel 28 and trunk panel (not shown) also bound back light (not shown) of vehicle 20.

Figure 2:
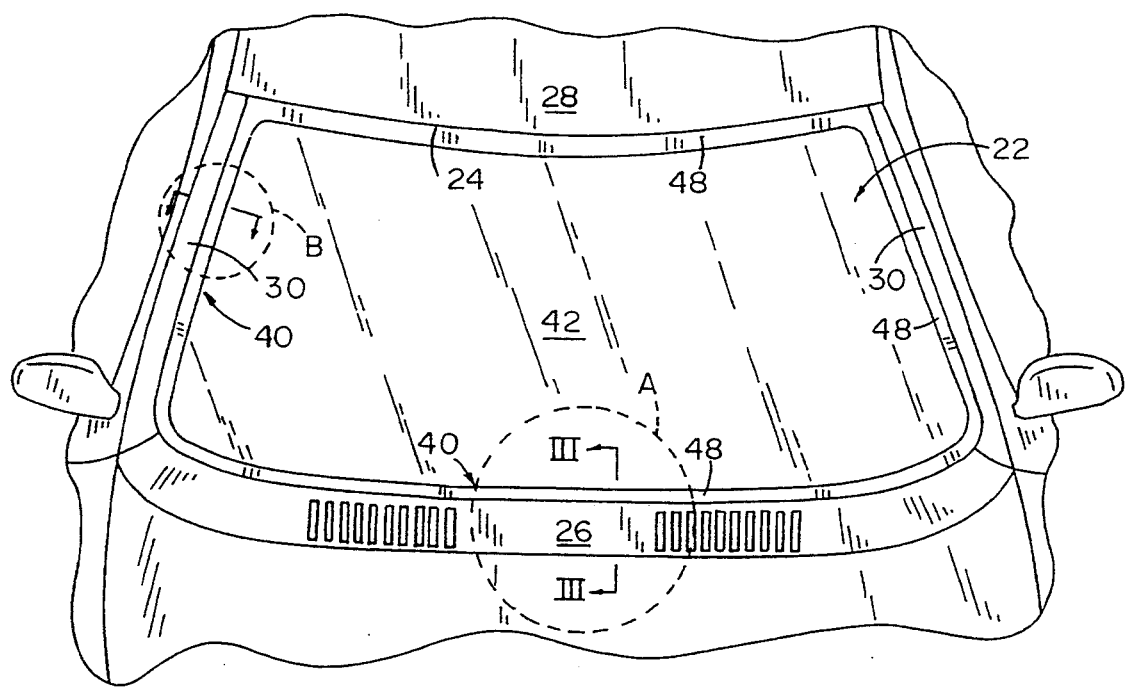
FIG. 2 is a windscreen of the vehicle shown in FIG. 1.

As shown in FIG. 2, a multi-part panel assembly 40 is used in connection with windscreen 22. Windscreen 22 includes a transparent, glass sheet or panel 42 which may be tempered, laminated or otherwise strengthened using conventional principles. Panel 42, comprising a first panel of multi-part panel assembly 40, may also be curved to fit within and close windscreen opening 24. Although not necessary, it is preferred that an inside peripheral surface of panel 40 include an opaque ceramic frit layer 44 (FIG. 3), well-known in the industry, to cosmetically improve the appearance of windscreen 22 once in the vehicle. Opaque frit layer 44 conceals unfinished portions of window opening 24 once panel 42 is in place. At least a portion of peripheral edge 46 (FIG. 3) of panel 42 contains a gasket or attachment member 48 which may be molded directly on panel 42 from a resinous plastic or polymeric molding material. For laminated panels, it is preferred that the gasket be molded from a reaction injected molded (RIM) polyurethane because of the relatively low pressures required for the molding process. A thermoplastic material such as polyvinyl chloride may be used for non-laminated panels.

Prior to molding of gasket 48, the peripheral edge 46 may be cleaned in those areas where the gasket will engage the glass using a solvent such as methylethylketone and preferably coated with a primer to promote adhesion between panel 42 and gasket 48. A suitable primer for RIM urethane gaskets is provided under the designation AP-134, produced by Lord Corporation of Erie, Pa., while the primer suitable for polyvinyl chloride is "DX-4a" produced by Donnelly Corporation of Holland, Mich.

Figures 3, 4, 5:
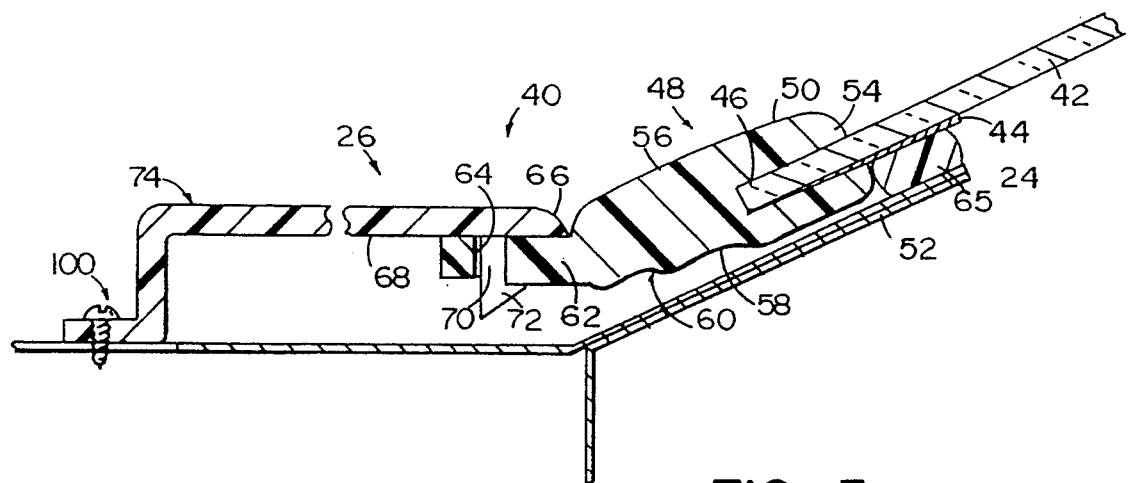
FIG. 3 is a side elevation, sectional view taken along lines III—III in FIG. 2.
FIGS. 4 and 5 are cross-sectional views of alternate embodiments of the present invention employed at the A-pillar of the vehicle.

As shown in FIG. 3, gasket 48 is molded directly about peripheral edge 46 of panel 42 and includes securing flanges 50 and 52 which extend inwardly on either side of panel 42. Securing flanges 50 and 52, together with that portion of gasket 48 bonded to the peripheral edge surface, are securely bonded to glass panel 42 during the molding process so as to securely fasten gasket 48 to the panel. From securing flanges 50 and 52, located along inner edge 54 of gasket 48, the gasket is profiled forming a convex upper surface 56 and a stepped lower surface 58. The profile of gasket 48 narrows toward outer edge 60 to form a flange 62. A plurality of slots or sockets 64 extend through flange 62 at predetermined spaced intervals and are elongated in a direction paralleling gasket 48 for the purpose of providing one-half of a securing assembly or coupler which will be described in greater detail below. The polymeric material comprising the slots or sockets should be sufficiently flexible to receive the securing assembly or coupler.

An adhesive designated as 65 is placed between panel 42 and the body sheet metal surrounding and defining opening 24 to bond panel 42 to the vehicle. Typically, an extruded urethane bead is used to bond panel 42 to vehicle 20. Auto manufacturers may use a variety of adhesives, one of which is sold under the trade name "BETASEAL," produced by Essex Specialty Products of Sayerville, N.J.

Lying immediately adjacent gasket 48 and overlying flange 62 extending from gasket 48 is one edge of cowl or leafscreen 26 comprising the second panel of multi-part panel assembly 40. Leafscreen inner edge 66 is designed to abut against the base of convex surface 56 at flange 62. A lower surface 68 of leafscreen 26 has an elongated post 70 adapted to extend through elongated slot or socket 64 in flange 62. Post 70 has a single barb detent 72 extending to one side at one end to retain the post within slot 64. Alternate embodiments of this coupling are described in greater detail below.

Leafscreen 26 is preferably formed from a high impact polypropylene co-polymer such as PP1188 produced by A. Schulman, Inc. of Birmingham, Mich., though alternate materials such as Celanox 6407 manufactured by The Celanese Corporation may be substituted. Using conventional injection molding techniques, leafscreen 26 may be molded to the desired shape and form for the specific application. The leafscreen may be molded in color or painted to match or complement the exterior color of the vehicle. The posts 70, contrary to the polymeric material forming slots or sockets 64, should be rigid to pass through slots or sockets 64 to provide relative ease in fastening and unfastening the two panels.

Leafscreen 26 may be detachably coupled to the vehicle at a second location so that it may be removed from the vehicle if desired. FIG. 3 generally illustrates that leafscreen panel 26 may be coupled toward its outer edge 74 by a variety of mechanical fasteners such as generally indicated by reference numeral 100. Other fastening mean are described more fully below in FIGS. 12-15.

In general, multi-part panel assembly 40 utilizes a first panel 42 of predetermined shape and size having at least a portion of a peripheral edge fixed with a gasket 48 or attachment member. A second panel 26 is adapted to lie adjacent the first panel 42 and overlie at least a portion of the gasket 48 or attachment member. The portion of gasket 48 underlying the second panel forms a first half of a coupler adapted to receive a second half 70 of a coupler extending from the second panel. In this manner, second panel 26 is both precisely aligned with and detachably coupled to the gasket which is secured to the vehicle. Second panel 26 may also be detachably coupled at a second location to the vehicle body to enable complete removal of the second panel if desired. The nature of the two couplers provides a secure attachment of the second panel 26 to the vehicle to withstand substantially any condition under normal use.

An advantage provided by panel assembly 40 is the substantial reduction in misalignment that occurs between such components on the assembly line. Since panel 42 and leafscreen 26 of this invention are joined by the coupling at gasket 48, inner edge 66 of leafscreen 26 is automatically aligned. As a preassembled panel assembly 40, it may be installed on the vehicle as a unit, economizing assembly time and labor. Moreover, since panel assembly 40 is preassembled, it may also be shipped to the auto assembler as a single part, thus reducing inventory and the administration associated therewith.

Panel assembly 40, described above in relation to the lower edge of windscreen 22, has similar applications at other portions of the vehicle. These other applications are illustrated, by way of example only, in FIG. 1 regions B–C. FIGS. 4 and 5 are cross-sectional views of alternate embodiments of multi-part panel assembly 40 at one A-pillar, shown in area B of FIG. 1. In both figures, the A-pillar includes a sheet metal pillar 80, a portion of which extends inwardly to define the lateral portions of windscreen opening 24. Another portion 82 forms the vehicle door opening. Pillar 80, as well as several other pillar posts located about the passenger compartment, support roof panel 28.

Similar to the previous embodiment described above, windscreen 22 has a shape and form adapted to nest within and close opening 24 As shown in FIGS. 4 and 5, at least a portion of the peripheral edge 46 of panel 42 is cleaned, primed and receives gasket 48, molded thereon with securing flanges 50 and 52. The profile of gasket 48 is reduced from inner edge 54 toward outer edge 60 to form flange 62 containing slots 64. Flange 62 is disposed in substantially the same plane as securing flange 50, away from pillar 80.

Instead of leafscreen 26, pillar 80 is covered by a second panel or decorative applique 84, extending the length of pillar 80 from roof panel 28 downwardly to the front quarter panel or fender. In one embodiment shown in FIG. 4, inner edge 86 of applique 84 is designed to lie at the base of convex upper surface 56 and overlie flange 62. In an alternate embodiment shown in FIG. 5, inner edge 86a of applique 84a extends over gasket 48a to windscreen panel 42 so that applique 84a covers and substantially conceals gasket 48a. In this embodiment, upper convex surface 56a is significantly reduced from surface 56 shown in FIG. 4 to allow applique 84a to be close to windscreen panel 42 while simultaneously keeping the overall shape of applique 84a close to the vehicle.

In FIG. 4 applique 84 includes one or more securing posts 88 on or spaced along its inside surface. Each post 88 includes a single detent offset to one side, which post is adapted to be received by slots 64. It is preferred in this embodiment that securing post 88 be located along, or substantially close to, the inner edge 86. This location of securing post 88 reduces dimpling or shrinkage of the preferred urethane (TPU) material, described above, which is molded to form the applique. Since the applique is adapted to receive a high-gloss finish, dimpling or shrinkage of the urethane will cause an imperfection in finish surface 90. Thus, such imperfections are moved to the outer edges of the panel where they are less noticeable.

FIG. 5, on the other hand, illustrates post 88a inboard of inner edge 86a. The inner edge 86a extends over and conceals gasket 48a thus locating pin or post 88a over slot 64a. Also note FIG. 5 illustrates, in the alternative, a dual detent used to retain post 88a within slot 64a.

A variety of detachable fasteners may be used at a second location interconnecting pillar 80 and the inner surface 92 of applique 84. As seen in FIGS. 4 and 5, one-half 94 of a detachable fastener 76 is preferably adhered with an adhesive in a sink or channel 96 defined in pillar 80. An opposite half 98 of the detachable fastener 76 may be fixed by adhesive or the like to inner surface 92 of applique 84. It is preferred that fastener 76 be detachable under tension, yet strong enough to retain applique 84 in place under normal use in the alternative, or in addition to fastener 76, a threaded fastener 100, shown in phantom in FIG. 4, may extend through applique branch 82 and into pillar 80 to retain applique panel 84 in place.

Figure 6:
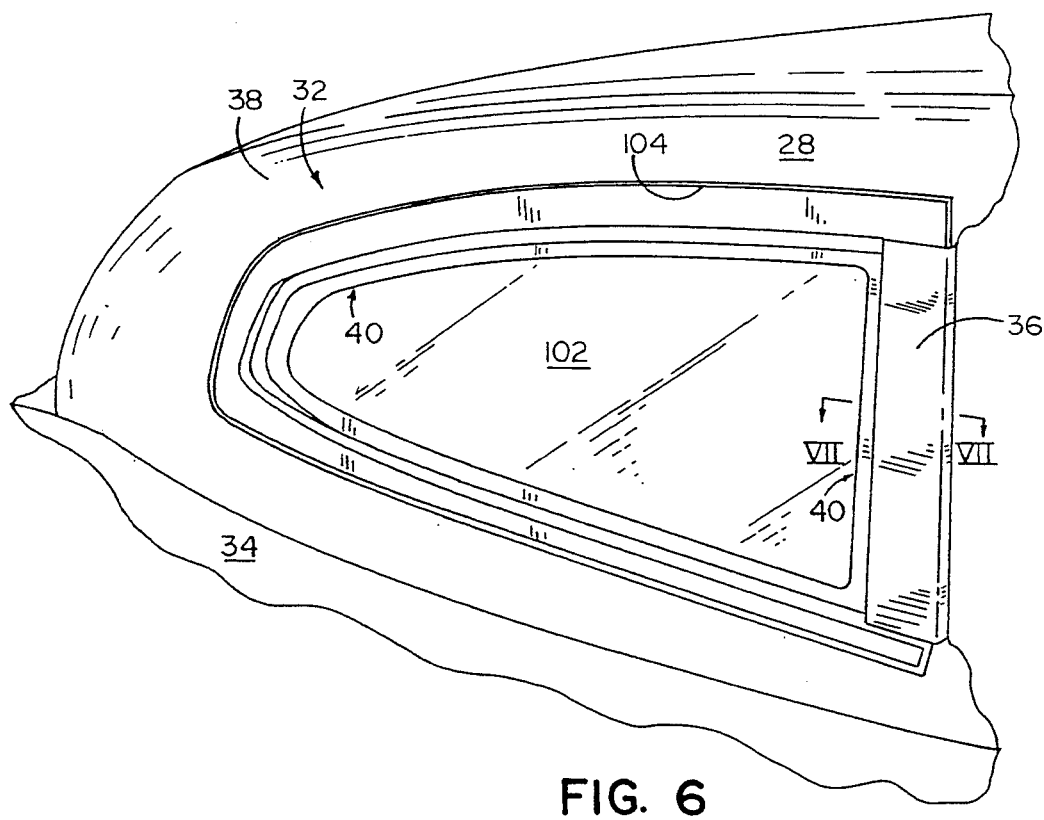
FIG. 6 is an enlarged illustration of the rear quarter window shown in FIG. 1.

FIG. 6 is an enlarged illustration of rear quarter window 32 shown in FIG. 1. Rear quarter window 32 is bounded along its lower edge by rear quarter panel 34, along its forward edge by B-pillar 36, and C-pillar 38 and roof panel 28 along its upper edge. This environment offers at least two applications of multi-part panel assembly 40 along each of the pillars, 36 and 38. Other applications may be envisioned for trim pieces extending into quarter panel 34 and roof panel 28. However, for the purposes of simplicity, the following discussion will be made in relation to its application in association with B-pillar 36. It should be understood that although specific application of the invention to C-pillar 38 will not be discussed in detail, the structural relation of the various components will be substantially the same as those described in relation to B-pillar 36. Possible differences may reside in the cross section of the posts within each pillar, otherwise the two regions have substantially similar or equivalent components.

Figure 7:
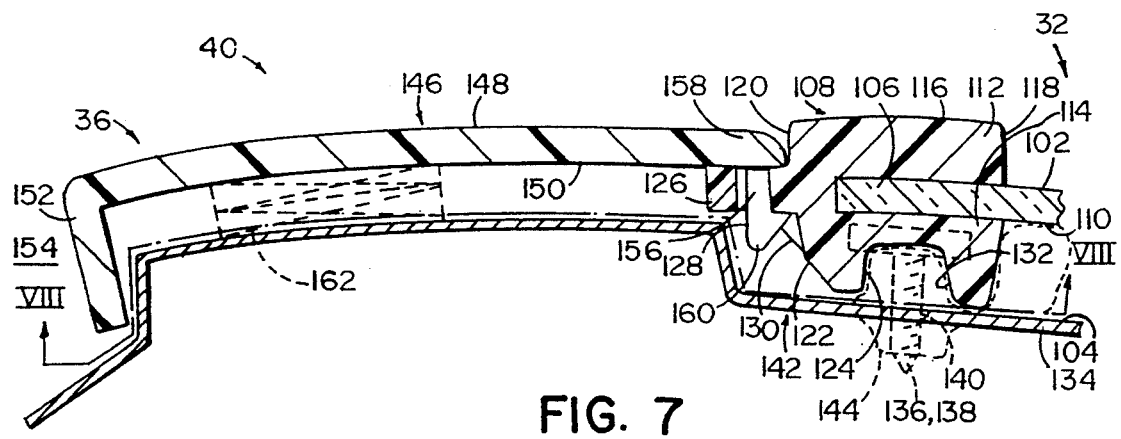
FIGS. 7 and 8 are sectional and bottom plan views, respectively, taken along lines VII—VII and VIII—VIII, as seen in FIGS. 6 and 7.
Figure 8:
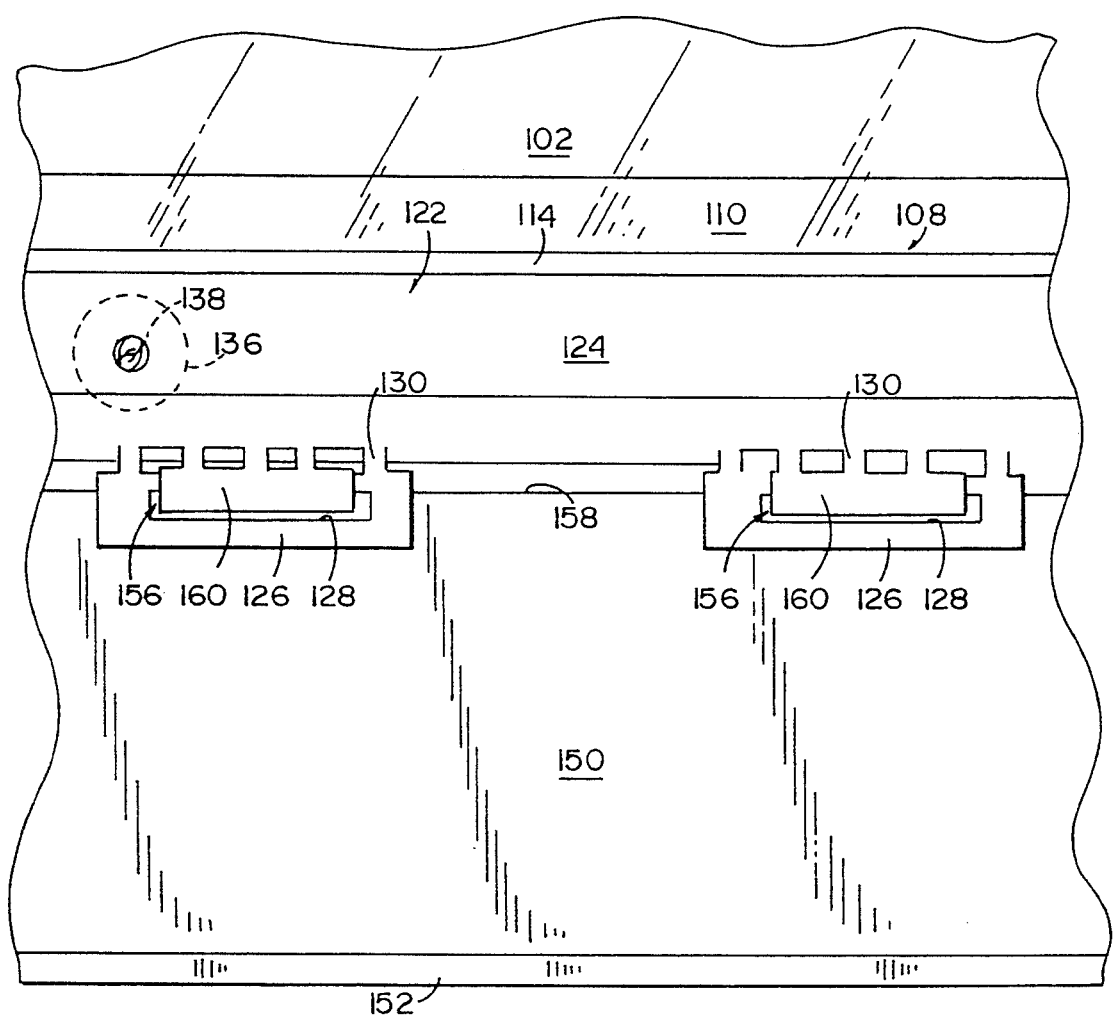

Referring to FIGS. 6–8, rear quarter window 32 includes a glass panel 102 forming the first panel of multi-part panel assembly 4C. Panel 102 may be transparent or opaque, and of a particular shape adapted to nest within and close opening 104. Depending upon whether panel 102 is fixed or movable, all or a portion of the panel's peripheral edge 106 has a urethane, PVC or other resinous plastic gasket 108. As in the previous embodiments, panel 102 may include a ceramic frit layer 110 along its inner surface adjacent its periphery. It is again preferred that at least the portion of peripheral edge 106 receiving gasket 108 be cleaned and receive a suitable primer to improve the bonding between panel 102 and molded gasket 108.

Gasket 108 is molded directly about peripheral edge 106 so that securing flanges 112 and 114 extend inwardly on each side of panel 102 from the edge. Although a three-sided encapsulation is disclosed, gasket 108 may be molded to a single side of panel 102 along peripheral edge 106. In FIGS. 5, 7 and 8, gasket 108 is profiled, having a slightly convex upper surface 116 between inner edge 118 and outer edge 120. Lower surface 122 includes a channel 124 which is substantially coextensive with gasket 108.

Outer edge 120 includes at least one flange 126, and preferably several at spaced intervals along the length of gasket 108, adapted to receive the second panel 146. Flange 126 further includes at least one slot 128 elongated in a direction paralleling gasket 108. Each flange 126, extending from outer edge 120, is flexible to some degree given the characteristics of the polymeric material from which it is formed. To bolster each flange 126, braces or gussets 130 may be located periodically to interconnect flange 126 with lower surface 122 of gasket 108. Braces 130 are molded as an integral part of gasket 108.

To fix panel 102 and gasket 108 within opening 104, a bead of adhesive 132, such as described above, is applied between panel 102 and pinch flange 134. In the alternative, studs 136, shown in phantom, may be captured or molded within gasket 108 so that a shaft 138 extends through a hole 140 in pillar 142, and is retained by nut 144. The retention of studs in molded gaskets is described in greater detail in U.S. Pat. No. 4,139,234 issued Feb. 13, 1979, assigned to the same assignee as the present invention, which is incorporated herein in its entirety by reference.

Attached to flange 126, and concealing pillar 142, is applique panel 146 also preferably molded from urethane (TPU) and having a painted outer surface 148 and an inner surface 150. A leg portion 152 of applique 146 is angled so as to protrude into door opening 154. Applique 146 is retained over post 142 at a first and second location spaced from one another by detachable fasteners. At a first location, securing post or pin 156 extends from inner surface 150 proximate edge 158 butted against outer edge 120 of gasket 108. Post 156 is elongated in a direction parallel to slot 128 and includes a catch such as single barb detent 160 adapted to engage the back of flange 126 and retain edge 158 of applique 146 against gasket 108. Applique 146 is detachably coupled at a second location by way of detachable coupler 162 interconnecting inner surface 150 of applique 146 to post 142, described in greater detail below.

Figure 9:
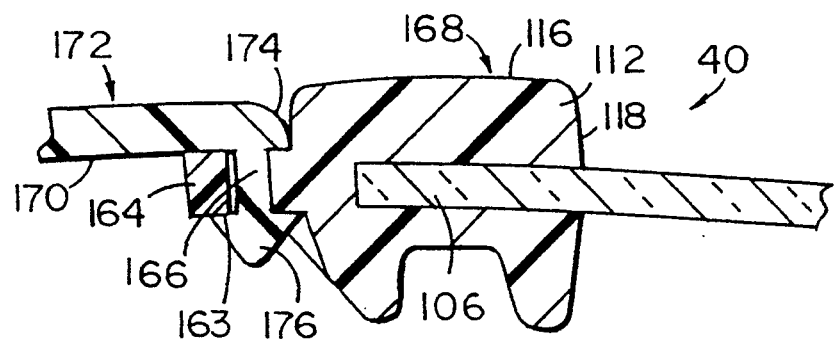
FIGS. 9-11 illustrate various post-attachment members including various types of detachable couplers therebetween.
Figure 10:
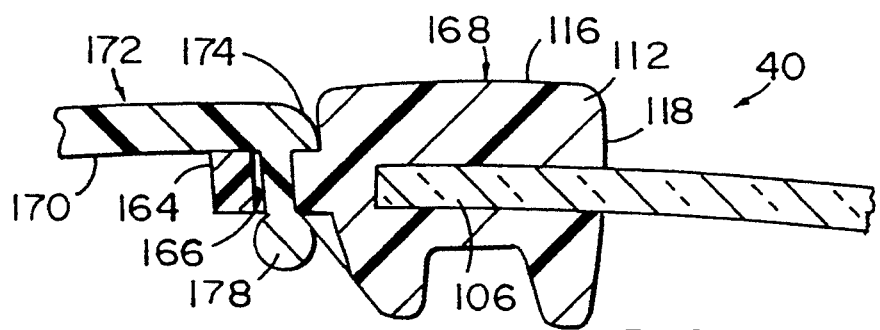
Figure 11:
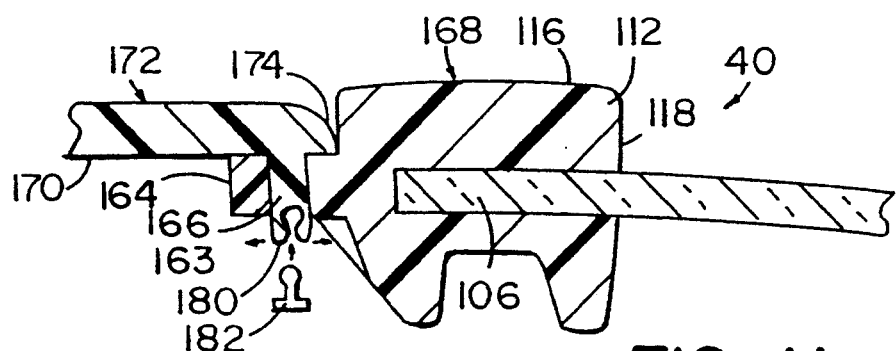

FIGS. 9-11 illustrate alternate embodiments of the coupling between the gasket, and panel or applique. As briefly mentioned-above, a primary object of the instant invention is to provide an easily detachable vehicle panel or applique immediately adjacent a substantially fixed panel. The relationship between the two panels should be such as to provide proper panel alignment and a smooth, aerodynamic transition while simultaneously providing an aesthetic appearance. Slots 163 in flange 164 of gasket 168 comprise a first portion of a coupler. A second portion of a coupler is post 166 which extends from inner surface 170 of applique 172.

FIG. 9 is an alternate embodiment of the coupling shown previously in FIGS. 3-8. Flange 164, extending from gasket 168, contains at least one, and preferably a plurality of slots 163. Applique 172 has a plurality of posts 166 extending from inner surface 170 proximate inner edge 174. Post 166 contains a double barb detent 176 at the end of post 166 which is forced through slot 163 and retained in place by detents 176. Additional couplings are illustrated in FIGS. 10 and 11, wherein FIG. 10 illustrates a rounded, bulb detent 178 and FIG. 11 illustrates a channel 180 defined in the end of post 166 and adapted to receive a pin or expander 182. Expander 182 wedges apart post 166 so as to hold and retain the post within slot 163.

FIGS. 12-15 are fragmentary, cross sectional views illustrating various embodiments of detachable couplers such as 76 and 162 used to form the second coupling in attaching the panel or applique to the vehicle.

FIG. 12 illustrates a preferred embodiment for coupling panel 26 or appliques 84, 146 and 172 to vehicle 20. For simplicity, reference numeral 183 will be used to refer to a generic panel or applique, as described above. In substantially all anticipated situations, applique 183 will overlie and conceal a portion of the vehicle body indicated by reference numeral 184. Applique 183 is retained in place with respect to body 184 by a detachable coupler 185, such as produced under the trademark "DUAL-LOCK" and manufactured by The 3M Company of Minneapolis, Minn. The "DUAL-LOCK" fastener 185, shown in greater detail in FIG., 12a, includes two interlocking sheets, 186 and 188, respectively, each having a self-adhering back surface 190. The interlocking faces of the two sheets include a pattern of equilength projections 192 terminating in hemispherical caps 194. As the two sheets are pressed together, caps 194 in each sheet are forced past each other. Flat surfaces 196 on the back of each cap 194 engage identical surfaces of the caps on the opposite sheet, providing a secure coupling. The coupling is such that opposing axial forces, shown by arrows AF, must be significant in order to break the connection. However, opposing angular or rotational forces shown by arrows RF result in disconnection of the coupling.

FIG. 13 is illustrative of the same coupling shown in FIG. 12 with the exception that one sheet of the "DUAL-LOCK" fastener 188 is coupled to vehicle body 184 by way of a "Christmas tree" post 198 extending through an appropriately sized hole 200. FIGS. 14 and 15 illustrate alternate embodiments of means for coupling panel or applique 183 to the vehicle FIG. 14, similar to FIG. 4 above, illustrates a threaded-fastener 202 located on a recessed portion. FIG. 15 illustrates the use of a double-sided tape 204. It is to be understood that alternate methods may be used to couple the applique to the vehicle.

In operation, a panel of predetermined shape and form is selected for the appropriate vehicle. As mentioned above, a first panel of assembly 40 may be a window or opaque panel adapted to fit within and closing an opening in the vehicle body. For the purposes of the following description a single transparent and tempered sheet of glass such as rear quarter window 32, shown in FIGS. 1 and 6-8, will comprise the first panel.

Refer now to FIG. 7. Before molding, the peripheral edge 106 of panel 102 to receive molded gasket 108 is cleaned by a solvent and primed. If gasket 108 is to be molded from a RIM (reaction injection molded) urethane, methylethylketone solvent may be used to clean the glass. AP-134 Lords primer may be applied after the solvent has been driven off to prepare the surface to receive the gasket. However, if PVC is the desired molding material, the same solvent may be used to clean, but primer DX-4a by Donnelly Corporation of Holland, Mich. is the preferred primer used to prepare the glass surface.

Once the surface is cleaned and primed, glass panel 102 is inserted into a mold appropriate for the shape of the glass to mold gasket 108. The mold halves are pressed together and the polymeric material is injected along the desired portion of the panel's peripheral edge. After the polymer has cured, the panel 102 and molded polymeric gasket or attachment member 108 are removed as a unit and moved on in the assembly process.

Applique 146 is molded using conventional injection molding techniques and may be painted for the specific vehicle. Gasket 108 is then coupled to the appropriate applique 146. Inner surface 150, spaced from edge 158, has a mated "DUAL-LOCK" brand fastener secured thereto by removing the self-adhesive protective backing from one of the interlocking sheets. The protective backing for the opposite sheet is left intact for shipping. Inner edge 158 is brought proximate flange 126 so as to insert securing post 156 through slots 128 in the flange. Insertion of securing post 156 into slot 128 places inner edge 158 of applique 146 at the desired location, aligning it with gasket 108 within one-eighth of an inch, or less. In an alternate embodiment, inner edge 158 overlies and conceals gasket 108, as described in relation to FIG. 5. In either case, detents 160 at the top of securing post 156 engage the lower surface of flange 126 and restrict withdrawal of securing post 156 from slot 128. Attachment of applique 146 to gasket 108 completes the preassembly of panel assembly 40. Assembly 40 is packaged and labeled for shipment to the auto assembler.

It is contemplated that an adhesive for bonding the first panel to the vehicle may also be preapplied to panel 102 and gasket 108, protected by a protective strip, such that an assembler only need remove the protective strips to install assembly 40. However, an assembler may wish to apply the adhesive to the panel assembly before installation in the vehicle.

Although this invention has been described with reference to reaction injection molded (RIM) urethane and polyvinyl chloride (PVC), the basic concept of this invention may be implemented using other materials such as low pressure PVC or liquid PVC. In addition, different molding techniques may be used to form the gasket/attachment member including compression molding. Based upon the numerous techniques, there are also different ways to install the gasket/attachment member on the glass, including molding the gasket separately and placing it around the peripheral edge of the first panel. The applique panel may also be manufactured from a variety of materials other than those outlined above. Although it is preferred that the applique be made from a molded material, metal may also be used. Appliques described above may also have applications extended beyond trim and access panels. For example, the above technique may be extended to entire body panels, not only in vehicles, but appliance and buildings as well.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows.

1. A multi-part panel assembly for a vehicle having at least one portion detachable from the vehicle, comprising in combination:
   a first panel having a peripheral edge and adapted to close an opening in the vehicle;
   a second panel detachable from said first panel and adapted to be adjacent said first panel and overlie at least a portion of the vehicle;
   an attachment member secured on said peripheral edge of said first panel;
   securing means on said attachment member and second panel for detachably mounting said second panel to said first panel; and
   coupling means spaced from said securing means for detachably coupling said second panel to the vehicle.

2. The panel assembly of claim 1, wherein said attachment member is molded directly to said first panel.

3. The panel assembly of claim 2, wherein said attachment member further includes a polymeric gasket molded directly on and encapsulating the entire peripheral edge of said first panel.

4. The panel assembly of claim 1, wherein said securing means include:
   at least one post having a detent at one end and extending from said second panel along a surface proximate said attachment member; and
   said attachment member including at least one socket adapted to receive said one post.

5. The panel assembly of claim 4, wherein said detent at the end of said post is a single barb detent.

6. The panel assembly of claim 4, wherein said detent at the end of said post is a double barb detent.

7. The panel assembly of claim 4, wherein said detent at the end of said post is a bulb detent.

8. The panel assembly of claim 4, which includes:
   an expandable slot defined in the end of said post; and
   means received by said expandable slot for spreading the end of said post apart.

9. The panel assembly of claim 1, wherein said coupling means for detachably coupling said second panel to the vehicle include:
   a first portion of a detachable fastener secured to an inner surface of said second panel; and
   a second portion of a detachable fastener adapted to be secured to an outer surface of the vehicle opposite said first portion and adapted to engage said first portion, so that said second panel may be detachable from the vehicle.

10. The panel assembly of claim 9, wherein said coupling means include a two-piece hemispherical-type coupler.

11. The panel assembly of claim 9, wherein said coupling means include a first and a second pad of interlocking projections, said first pad secured to an inside surface of said second panel and said second pad adapted to be secured to the vehicle.

12. The panel assembly of claim 9, wherein said coupling means includes double-sided tape.

13. The panel assembly of claim 9, wherein said coupling means includes a threaded fastener.

14. The panel assembly of claim 1, wherein said first panel includes a glass sheet.

15. The panel assembly of claim 1, wherein said first panel is transparent.

16. The panel assembly of claim 1, wherein said first panel is opaque.

17. The panel assembly of claim 15, wherein said first panel is a fixed window, said attachment member forming a gasket such that said first panel will close an opening in the vehicle.

18. The panel assembly of claim 14, wherein said second panel is a trim piece for the vehicle.

19. The panel assembly of claim 18, wherein said trim piece is a decorative applique molded from resinous plastic material.

20. The panel assembly of claim 14, wherein said second panel is a cowl.

21. The panel assembly of claim 20, wherein said cowl is a leafscreen.

22. The panel assembly of claim 18, wherein said trim piece overlies one of the roof support pillars of the vehicle.

23. A multi-part panel assembly for a vehicle having at least one portion detachable from the vehicle, comprising in combination:
- a first panel having a peripheral edge;
- a second panel adapted to lie adjacent said first panel;
- a gasket molded about and encapsulating said peripheral edge of said first panel;
- securing means on said gasket and second panel for detachably interconnecting said first and second panels; and
- coupling means spaced from said securing means for detachably coupling said second panel to the vehicle.

24. The panel assembly as recited in claim 23, wherein said first panel includes a transparent sheet.

25. The panel assembly as recited in claim 23, wherein said first panel includes an opaque sheet.

26. The panel assembly as recited in claim 23, wherein said second panel includes a decorative panel.

27. The panel assembly as recited in claim 23, wherein said second panel includes a trim piece.

28. The panel assembly as recited in claim 23, wherein said second panel includes a leafscreen.

29. The panel assembly as recited in claim 23, wherein said second panel includes a cowl panel.

30. The panel assembly as recited in claim 23, wherein said securing means include:
- at least one securing post, having detent means at one end and extending from said second panel along a surface proximate said gasket; and
- at least one slot defined along an outer edge of said gasket adapted to receive said securing post.

31. The panel assembly as recited in claim 23, wherein said coupling means includes a mechanical fastener.

32. The panel assembly as recited in claim 30, wherein said detent means at the end of said securing post includes an enlarged tip.

33. The panel assembly as recited in claim 30, wherein said detent means at the end of said securing post include at least one barb extending from a side of said post.

34. The panel assembly as recited in claim 23, wherein said coupling means include:
- a first portion of a detachable fastener secured to an inner surface of said second panel distant from said securing means; and
- a second portion of a detachable fastener adapted to be secured to an outer surface of the vehicle opposite said first portion and adapted to engage said first portion so that said second panel may be detachable from the vehicle.

35. A multi-part panel assembly for a vehicle, comprising:
- a glass panel having a peripheral edge;
- a gasket molded about at least a portion of said peripheral edge of said glass panel and having an exterior surface defining a securing means;
- a decorative panel adapted to be secured to the vehicle adjacent said glass panel to overlie and cover a portion of the vehicle body, and having a first means for detachably mating with said securing means; and
- coupling means spaced from said securing means for detachably coupling said second panel to the vehicle body.

36. A multi-part panel assembly for a vehicle body, comprising:
- a first panel made from a sheet-like material and having a peripheral edge defined by an end surface joining parallel and opposing outer surfaces;
- a gasket molded from a polymeric material about and bonded by molding to the peripheral edge of said first panel and capturing said first panel therein, said gasket having a profile defining a generally convex outer surface, a U-shaped inner surface, and female securing means extending from a surface opposite said first panel;
- a second panel adapted to be fixed to the vehicle body adjacent said first panel to overlie and cover a portion of the vehicle body, said second panel including male securing means detachably mating with said female securing means extending from said gasket; and
- coupling means spaced from said securing means for detachably coupling said second panel with the vehicle body.

* * * * *

UNITED STATES PATENT AND TRADEMARK OFFICE
CERTIFICATE OF CORRECTION

PATENT NO. : 5,352,010
DATED : October 4, 1994
INVENTOR(S) : Brodie, et. al.

It is certified that error appears in the above-indentified patent and that said Letters Patent is hereby corrected as shown below:

Title page, item [73] Assignee:   should read--Donnelly Corporation, Holland, Michigan--.

Col. 1, line 34;
        "fragile" should be –frame–.

Col. 5, line 34;
        After "Fig. 1" insert –by–.

Col. 5, line 46;
        After "opening 24" insert –.–.

Col. 6, line 29;
        "use in the" should be –use. In the–.

Signed and Sealed this

First Day of August, 1995

Attest:

BRUCE LEHMAN

Attesting Officer

Commissioner of Patents and Trademarks